R. GOLDSTEIN.
PHOTOGRAPHIC MAGAZINE CAMERA.
APPLICATION FILED JUNE 3, 1910.

1,007,440.

Patented Oct. 31, 1911.

2 SHEETS—SHEET 1.

WITNESSES:

INVENTOR
Robert Goldstein
BY
ATTORNEYS

R. GOLDSTEIN.
PHOTOGRAPHIC MAGAZINE CAMERA.
APPLICATION FILED JUNE 3, 1910.
1,007,440.
Patented Oct. 31, 1911.
2 SHEETS—SHEET 2.
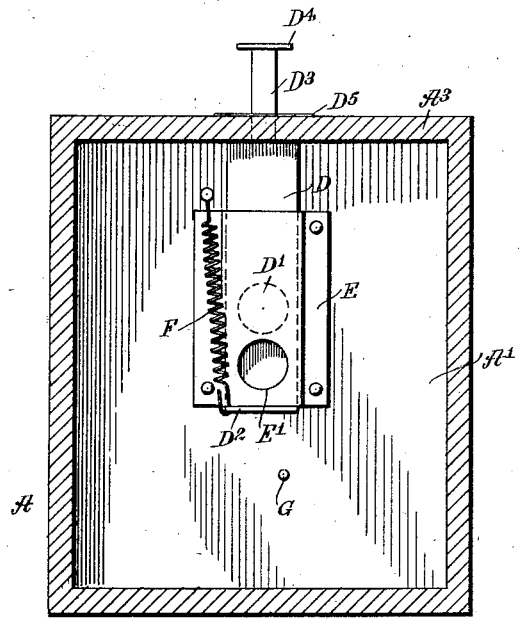
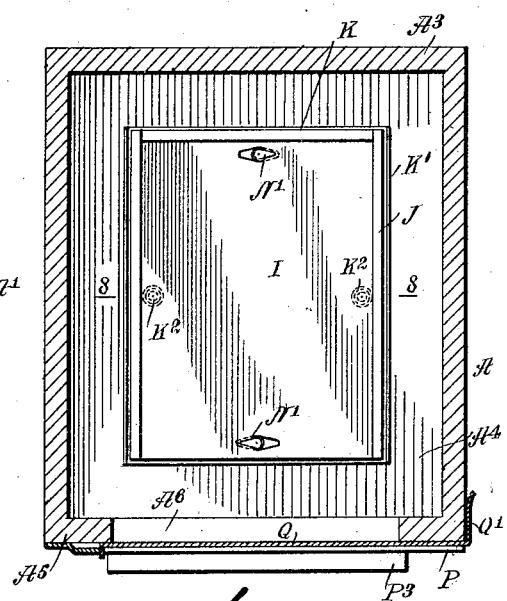
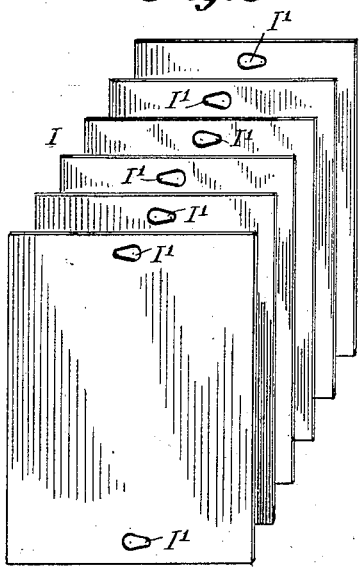
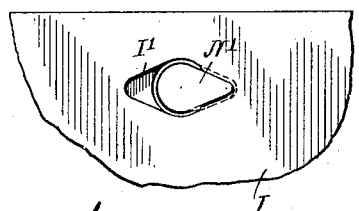
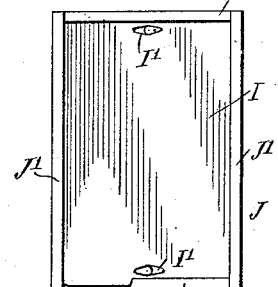
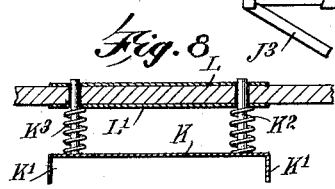
WITNESSES:
INVENTOR
Robert Goldstein
BY
ATTORNEYS

UNITED STATES PATENT OFFICE.

ROBERT GOLDSTEIN, OF NEW YORK, N. Y.

PHOTOGRAPHIC MAGAZINE-CAMERA.

1,007,440.  Specification of Letters Patent.  Patented Oct. 31, 1911.

Application filed June 3, 1910. Serial No. 564,789.

*To all whom it may concern:*

Be it known that I, ROBERT GOLDSTEIN, a citizen of the United States, and a resident of the city of New York, borough of Manhattan, in the county and State of New York, have invented a new and Improved Photographic Magazine-Camera, of which the following is a full, clear, and exact description.

The object of the invention is to provide a new and improved photographic magazine camera, arranged for daylight loading and for quickly and successively discharging the exposed sensitized plates from the camera into a tank filled with a developing fluid, and for preventing the plates from being light struck while in the camera or while being transferred from the camera to the tank.

For the purpose mentioned use is made of a magazine plate holder yieldingly mounted within the camera casing above a normally-closed outlet opening in the bottom of the casing, the said plate holder having retaining and releasing means capable of being manually actuated from the outside, to successively release the plates in the holder and allow the released plate to drop through the said outlet opening into a tank containing a developing fluid into which the exposed plate drops for developing purposes.

A practical embodiment of the invention is represented in the accompanying drawings forming a part of this specification, in which similar characters of reference indicate corresponding parts in all the views.

Figure 1:
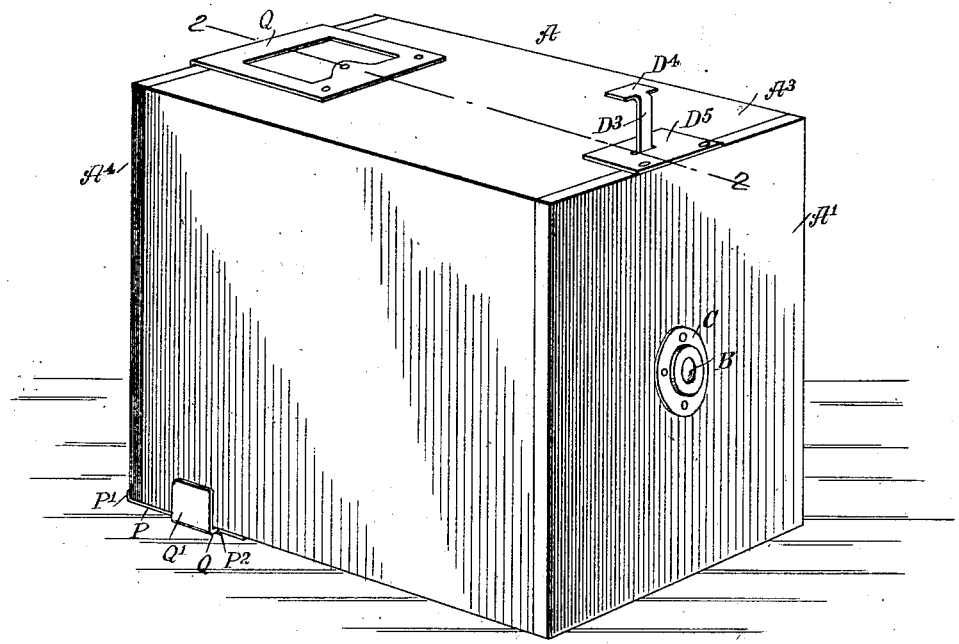
Figure 2:
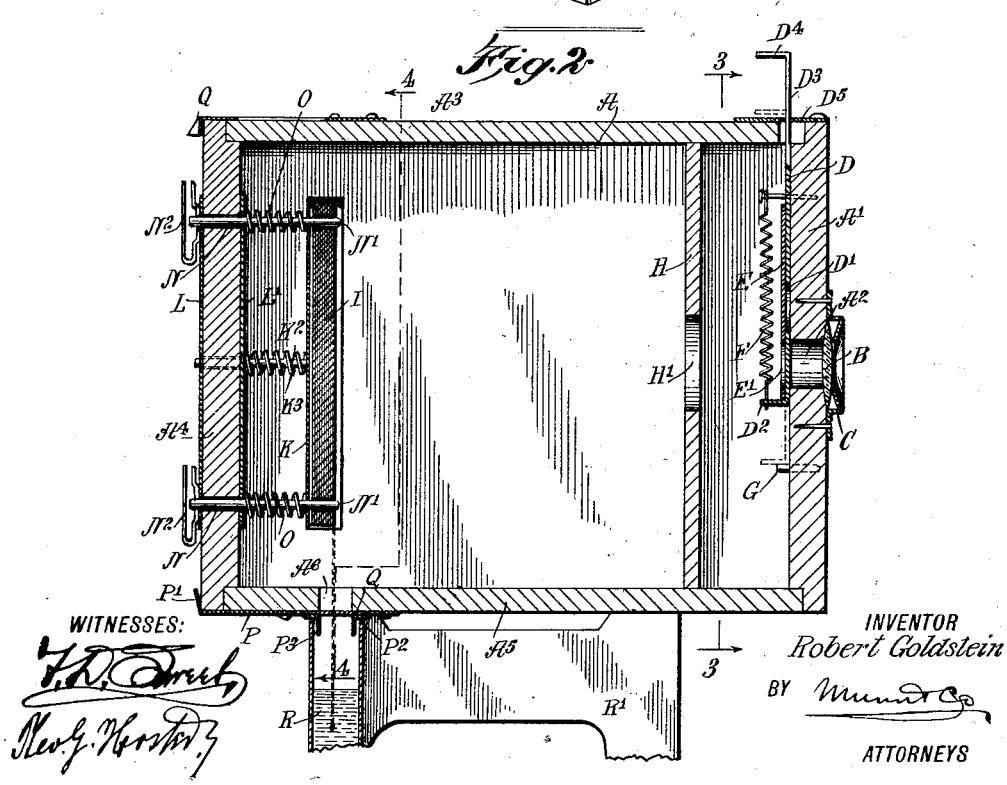

Figure 1 is a perspective view of the photographic magazine camera; Fig. 2 is a longitudinal section of the same on line 2—2 of Fig. 1; Fig. 3 is a cross section of the same on the line 3—3 of Fig. 2; Fig. 4 is a similar view of the same on the line 4—4 of Fig. 2; Fig. 5 is a perspective view of the sensitized plates in disassembled position; Fig. 6 is an enlarged face view of the retaining and releasing means for the sensitized plates; Fig. 7 is a reduced face view of the pack of sensitized plates; and Fig. 8 is a reduced sectional plan view of the plate holder in position on the back of the camera casing.

The casing $A$ of the photographic camera is provided at the outside of its front $A'$ with a lens $B$, held in place by a shield $C$ and in register with an opening $A^2$ formed in the front $A'$ of the camera casing, as plainly indicated in Fig. 2. The inner end of the opening $A^2$ is controlled by a vertical slidable shutter $D$ mounted to slide in a guideway $E$, having an opening $E'$ in register with the opening $A^2$, and attached to the inner face of the front $A'$, the said shutter having an opening $D'$ normally out of register with the opening $A^2$ but adapted to be moved into register with the same on pressing the shutter $D$ downward. The shutter $D$ is normally held in an uppermost position by the action of a spring $F$, secured at its upper end to the front $A'$ and attached at its lower end to a foot $D^2$, projecting from the lower end of the shutter $D$, and which foot forms a stop to limit the upward movement of the shutter $D$ by abutting against the lower end of the guideway $E$. The downward movement of the shutter $D$ is limited by the foot $D^2$ striking a stop pin $G$, attached to the inside of the front $A'$ of the casing. The upper end $D^3$ of the shutter $D$ is reduced and terminates in a handle $D^4$, and the said end $D^3$ is mounted to slide in a guide plate $D^5$ attached to the top $A^3$ of the camera casing $A$. In the rear of the shutter $D$ and its guideway $E$ and spring $F$ is arranged a transverse partition $H$ having an opening $H'$ in axial alinement with the opening $A^2$ and the lens $B$, so that the rays of light passing through the lens $B$, at the time the shutter $D$ is opened, can also pass through the opening $H'$ onto the sensitized face of the front plate of a series of sensitized positive plates $I$, arranged one in front of the other, and contained in a frame $J$ held in position on a plate holder $K$ yieldingly mounted on the back $A^4$ of the camera casing $A$. The holder $K$ is in the form of a plate having forwardly-extending side flanges $K'$, and from the back of the holder extend rearwardly guide pins $K^2$, mounted to slide in suitable guideways arranged in metallic plates $L$, $L'$, attached to the inner and outer faces of the back $A^4$ of the camera casing. Springs $K^3$ are coiled on the guide pins $K^2$ and are interposed between the plate holder $K$ and the guide plate $L'$, so as to press the plate holder $K$ in a forward direction.

In order to hold the series of sensitized plates $I$ and their frame $J$ in position on the holder $K$, and to successively release the plates after an exposure is made, the following device is employed: Each of the sensitized plates I is provided near the top and bottom with elongated slots I', as plainly indicated in Fig. 5, and the slots of successive plates extend in opposite directions, and portions of the slots of the plates are in register with each other, for the passage of pins N extending rearwardly through openings in the plate holder K, the plates L, L' and the back $A^4$, and the forward ends of the said pins N are provided with angular arms N', adapted to engage the front face of the plate I in front at the time, the arm extending in an opposite direction to the elongation of the corresponding opening I' of the foremost plate. The rear ends of the pins N are provided with openings for the reception of removable handles $N^2$, adapted to rest against the outermost guide plate L, and on the pins N between the inner guide plate L' and the holder K are coil springs O, assisting the springs $K^3$ to hold the plate holder K and the sensitized plates I in a foremost position. The frame J for containing the series of plates I is preferably made of light metal, having sides J', top $J^2$ and a bottom $J^3$, grooved at their inner faces to receive the margins of the plates I, to hold the same in place, with the sensitized faces forward. The front plate is a blank, to be removed, as hereinafter more fully described, after the frame J with its plates is in position on the holder K. The bottom $J^3$ of the frame J is divided at or near the middle, so that after the frame J and the plates I are held in place, and the holder K by the pins N, then the sections of the bottom can be broken off from the sides, to open the frame at the bottom and thus allow the plates to drop out of the frame J when released by the pins N', as hereinafter more fully described. The back $A^4$ carrying the plate holder K is removable from the casing A, and for this purpose the lower end of the back $A^4$ is set on a bottom plate P, attached to the under side of the bottom $A^5$ of the camera casing A, the rear end of the plate P having an upwardly-extending flange P' to hold the lower end of the back $A^4$ in place. The upper end of the back $A^4$ is engaged by a spring catch Q, attached to the top $A^3$ of the camera casing.

The bottom $A^5$ of the camera casing is provided with a traversely-extending discharge opening $A^6$, directly below the foremost plate I, so that when the said plate is released and drops downward, it passes through the opening $A^6$, which latter is normally closed by a slide Q, to slide in a guideway $P^2$ formed in the bottom plate P. The slide Q is provided at one side of the camera casing with an upwardly-extending handle Q', adapted to be taken hold of by the operator, for moving the slide Q transversely, to open or close the discharge opening $A^6$. The plate P is provided with an opening, in register with the opening $A^6$, and with downwardly-extending flanges $P^3$ at the sides of the said plate opening, and which flanges $P^3$ are adapted to fit into a tank R, containing a developing fluid and forming a support for the camera casing to rest on during the time an exposed plate is to be discharged from the holder K and to drop through the opening $A^6$ and past the open slide Q into the developing fluid contained in the tank R. The latter is provided with an extension R' to properly support the camera.

The operation is as follows: In loading the camera with a pack of sensitized plates I, held in the frame J, the operator removes the back $A^4$ from the casing A, and withdraws the locking handles $N^2$ from the pins N, so that the latter can be removed from the guide plates L, L' and the holder K, and inserted from the front through the registering portions of the openings I', with the arm N' of each pin extending in an opposite direction to the elongation in the front plate of the pack of plates, as indicated in Fig. 4. The pins N are also passed through the openings in the holder K so as to support the pack of plates with the frame J in position on the holder, and the pins are also passed through the guide plates L, L', and then the locking handles $N^2$ are reëngaged with the outer ends of the said pins, to hold the parts in position, as indicated in Fig. 2. The operator now opens the slide Q and gives each of the handles $N^2$ a half turn, so that the arms N' are moved in register with the open elongated openings I' in the front blank plate, so that the latter is disengaged and drops through the opening $A^6$ to the outside of the casing, after which the operator closes the opening $A^6$ by pushing in the slide Q. The camera is now ready for making an exposure, and in order to do so, it is only necessary for the operator to press the shutter D downward the desired length of time, and then release the shutter, so that the rays of light are directed by the lens B onto the sensitized portion of the front sensitized plate I. After the exposure is made, the casing A is placed in position on the tank R, and then the slide Q is drawn out, after which another half a turn is given to the handles $N^2$, so that the arms N' release the front exposed plate, which latter now drops through the opening $A^6$ into the developing fluid contained in the tank R. When this has been done, the slide Q is closed and the casing A is removed from the tank R. Another exposure can now be made, and after a certain length of time the previously exposed and now developed plate is removed from the tank R.

It is understood that whenever a plate I is released and allowed to drop out of the casing A, the holder K is moved forward by the action of the springs K³ and O a distance corresponding to the thickness of the released and discharged plate, so that the front plate is at all times the proper distance from the lens B, that is, in focus.

The camera shown and described is very simple and durable in construction, can be cheaply manufactured, and readily and quickly loaded in daytime, and the sensitized plates can be readily released and discharged from the camera after an exposure is made.

Having thus described my invention, I claim as new and desire to secure by Letters Patent:

1. A photographic camera, comprising a casing provided in its bottom with a discharge opening, means for normally closing the opening, a magazine plate holder yieldingly mounted in the casing over the discharge opening, and means for supporting the sensitized plates on the plate holder and having detachable engagement with the said plates, said means forming the sole support for the plates and actuated from the outside of the casing, whereby when the said means is operated to release a plate, the said plate will be unsupported and drop edgewise through the discharge opening of the casing.

2. A photographic camera, comprising a casing provided in its bottom with a discharge opening, manually-controlled means for normally closing the said opening, a magazine plate holder yieldingly mounted in the said casing over the said discharge opening, retaining and releasing means having detachable engagement with the sensitized plates at top and bottom and adapted to be manually actuated from the outside of the casing to successively release the plates and allow the same to drop through the said discharge opening, and a tank containing a developing fluid and adapted to support the said casing, the tank inclosing the said discharge opening to receive the sensitized plate as the latter drops through the opening, the tank preventing light from passing into the camera casing by way of the said opening.

3. A photographic camera, comprising a casing, a lens, a shutter, a magazine plate holder mounted in the casing, and means for supporting the sensitized plates on the holder, one in front of the other, said means having detachable engagement with the plates at top and bottom, and forming the sole support for said plates, whereby when the said means is operated to disengage it from a plate, the plate will be unsupported and drop out of the plate holder.

4. A photographic camera, comprising a casing having a discharge opening in its bottom, a lens, a shutter, a magazine plate holder mounted in the casing, retaining and releasing means detachably engaging a plurality of vertically-disposed sensitized plates to hold them one in front of the other, and for successively releasing the said plates to allow the same to drop out of position in the plate holder, and a slide over the discharge opening in the bottom of the said casing and arranged directly below a portion of the said plates, so that when the slide is opened and a plate is released it drops edgewise through the said opening to the outside of the casing.

5. A photographic camera, comprising a casing having a discharge opening in its bottom, a lens, a shutter, a magazine plate holder mounted in the casing, retaining and releasing means detachably engaging a plurality of vertically-disposed sensitized plates to hold them one in front of the other, and for successively releasing the said plates to allow the same to drop out of position in the plate holder, a slide over the discharge opening in the bottom of the said casing and arranged directly below a portion of the said plates, so that when the slide is opened and a plate is released it drops through the said opening, guideways on the under side of the said casing on opposite sides of the said opening, and a developing tank for supporting the said casing and engaged by the said guideways to guide the plate into the fluid contained in the tank.

6. A photographic camera, provided with a casing, a magazine plate holder yieldingly mounted in the said casing, turnable pins extending to the outside of the casing and provided at their inner ends with angular arms, and sensitized plates arranged one in front of the other and having elongated slots extending alternately in opposite directions and having portions in register with each other, the said pins passing through the said registering portions, and the said arms being adapted to engage the faces of the plates to hold the plates in place and to release the foremost plate on turning the pins and moving their arms in register with the slots.

7. A photographic camera provided with a casing, a magazine plate holder yieldingly mounted in the said casing, turnable pins extending to the outside of the casing and provided at their inner ends with angular arms, sensitized plates arranged one in front of the other and having elongated slots extending alternately in opposite directions and having portions in register with each other, the said pins passing through the said registering portions, and the said arms being adapted to engage the faces of the plates to hold the plates in place and to release the foremost plate on turning the pins and moving their arms in register with the slots, and springs interposed between the said plate holder and the back of the casing.

8. A photographic camera provided with a casing, a magazine plate holder yieldingly mounted in the said casing, turnable pins extending to the outside of the casing and provided at their inner ends with angular arms, sensitized plates arranged one in front of the other and having elongated slots extending alternately in opposite directions, and having portions in register with each other, the said pins passing through the said registering portions and the said arms being adapted to engage the faces of the plates to hold the plates in place and to release the foremost plate on turning the pins and moving their arms in register with the slots, and a frame containing the said plates and having sides, top and a removable bottom, the frame abutting against the front face of the said plate holder.

9. A photographic camera provided with a casing, a plate holder in the rear of the said casing, guide pins held on the holder and slidably engaging the back of the camera casing, springs interposed between the said plate holder and the said casing back, and pins slidably and turnably engaging the said plate holder and the said casing back and provided at the inner ends with angular arms.

10. A photographic camera provided with a casing, a plate holder in the rear of the said casing, guide pins held on the holder and slidably engaging the back of the camera casing, springs interposed between the said plate holder and the said casing back, pins slidably and turnably engaging the said plate holder and the said casing back and provided at the inner ends with angular arms, and handles removably engaging the outer ends of the pins for turning the same.

11. A photographic camera provided with a casing having a removable back, a plate holder in the said casing, guide pins held on the holder and slidably engaging the back of the camera casing, springs interposed between the said plate holder and the said casing back, pins slidably and turnably engaging the said plate holder and the said casing back and provided at the inner ends with angular arms, and handles removably engaging the outer ends of the pins for turning the same and for limiting the inward sliding movement of the pins.

12. A photographic camera, provided with a camera casing, a plate holder, pins having angular arms at the inner ends and slidably engaging the back of the casing and the said plate holder, sensitized plates one in front of the other and having openings extending alternately in opposite directions, portions of the openings being in register with each other for the passage of the said pins, and a frame containing the said plates and having a bottom adapted to be broken off the frame sides.

13. A metal frame having grooved sides, top and bottom for receiving and retaining a set of sensitized plates, the bottom being made in sections respectively attached to the sides and adapted to be broken off the sides.

14. A metal frame having grooved sides, top and bottom for receiving and retaining a set of sensitized plates, the bottom being made in sections attached to the sides and adapted to be broken off the sides, and a pack of sensitized plates having their margins extending in the grooves of the said frame, the said plates having elongated openings extending alternately in opposite directions, portions of the openings being in register with each other.

In testimony whereof I have signed my name to this specification in the presence of two subscribing witnesses.

ROBERT GOLDSTEIN.

Witnesses:
 THEO. G. HOSTER,
 PHILIP D. ROLLHAUS.

---

Copies of this patent may be obtained for five cents each, by addressing the "Commissioner of Patents, Washington, D. C."